United States Patent [19]

Clark et al.

[11] Patent Number: 5,057,765
[45] Date of Patent: Oct. 15, 1991

[54] CURRENT REGULATION CIRCUIT FOR INDUCTIVE LOADS

[75] Inventors: Andrew W. Clark, Worcester; Brett A. Zacher, Holden, both of Mass.

[73] Assignee: Allegro Microsystems, Inc., Worcester, Mass.

[21] Appl. No.: 650,510

[22] Filed: Feb. 5, 1991

[51] Int. Cl.$^5$ ............................................. G05F 1/40
[52] U.S. Cl. .................................. 323/288; 323/282; 323/284
[58] Field of Search ............... 323/282, 284, 288, 283; 388/803, 804, 806, 815, 822, 823, 915; 318/432, 434, 139; 361/152, 187

[56] References Cited

U.S. PATENT DOCUMENTS 4,215,383  7/1980  Boyd .................................. 361/210
4,811,188  3/1989  Bees .................................... 363/28

Primary Examiner—William H. Beha, Jr.
Assistant Examiner—Adolf Berhane

[57] ABSTRACT

An integrated circuit voltage chop circuit for regulating the current in an inductive load is of the type having a fixed off time. A current-sensing comparator produces a reset signal when the current through the driver exceeds a predetermined peak amplitude. A load driver transistor is turned on and off according to the state of a bistable memory elememt, e.g. a flip flop. An external capacitor and external series resistor are connected to the integrated circuit and they determine the driver off time. A voltage comparator having hysteresis produces a high output logic level when the capacitor charges to a predetermined voltage which sets the flip flop and begins to slowly discharge the capacitor. When the capacitor discharges to a lower predetermined voltage, the voltage comparator output goes to a low logic level turning on a shorting transistor that quickly discharges the capacitor completely. A logic gate with an output connected to the reset terminal of the flip flop resets the flip flop when both the output of the voltage comparator is in the low level and the output of the current-sensing comparator produces the reset signal. Thus during the period in which the capacitor is slowly discharging large transient current pulses due to charge storage in the load, i.e., in the recirculation diode and stray capacitance, are blocked from resetting the flip flop. The integrated circuit user may therefore adjust the blocking time by adjusting the external capacitor and then adjust the drive off time by adjusting the external resistor.

9 Claims, 5 Drawing Sheets

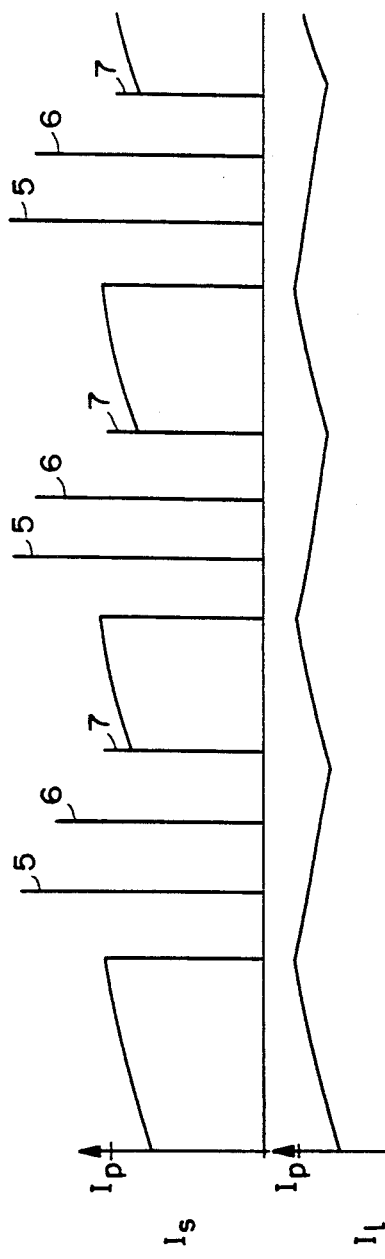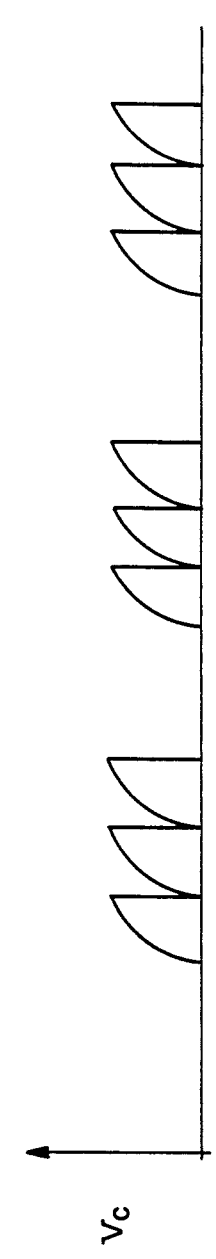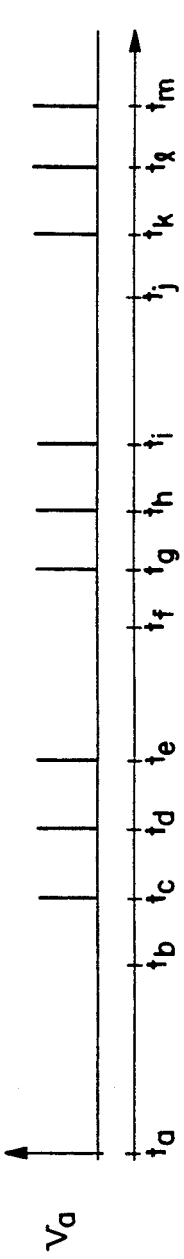

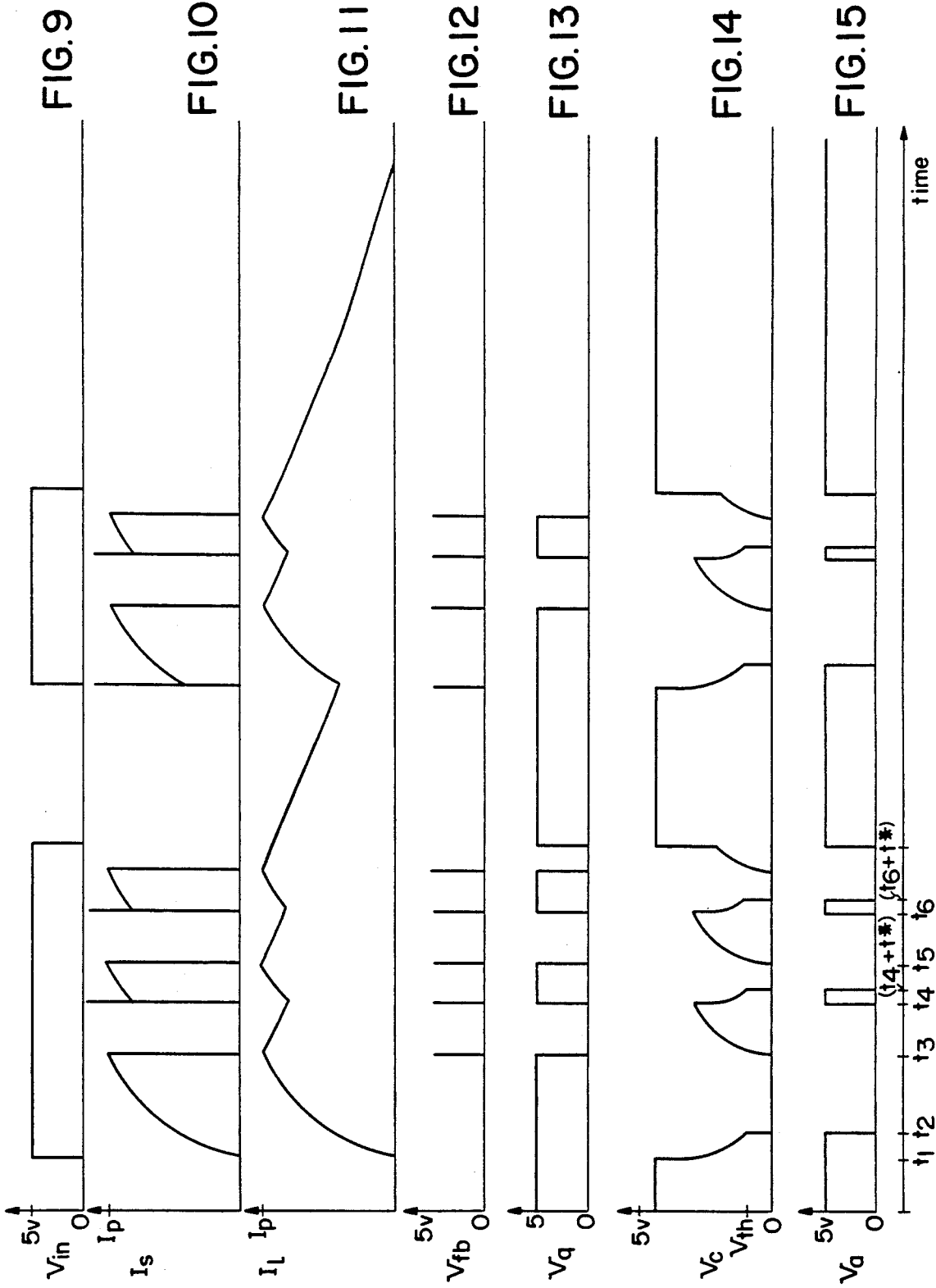

CURRENT REGULATION CIRCUIT FOR INDUCTIVE LOADS

BACKGROUND OF THE INVENTION

This invention relates to a voltage chop circuit for regulating a load current, especilly in an inductive load such as a motor, and more particularly relates to such a circuit providing a chopped output voltage with a fixed off time to control a transistor load-current driver that is essentially free of unwanted transients.

FIG. 1 illustrates such a voltage chop circuit of the prior art to which an inductive load 10 is connected. An early circuit of this type is drawn in FIG. 1 with solid lines, and the operation of this early circuit is described as follows.

Referring to the signal waveforms in FIGS. 2 through 7, the logic input voltage at the input terminal 12 has gone high moments before and the driver transistor 14 has consequently turned on so that a load current $I_L$ has begun to rise through the inductive load 10. The input voltage at terminal 12 is assumed to remain high during the remainder of the circuit operation to be described.

The inductive load 10 is most commonly a DC motor, represented here as an inductor 18 and a resistor 19. The fly-back diode 20 is commonly used to protect the driver transistor 14 from the back e.m.f. of the inductive load when transistor 14 turns off: the decaying load current $I_L$ also flows through the fly-back diode 20 during the period when transistor 14 is turned off.

The circuit of FIG. 1 is typically formed in an integrated circuit chip with the exception that the load 10, the resistor 28 and the capacitor 26 are discrete external components that are chosen and connected to the integrated circuit by the user. Also the current source 52 maybe wholly or partially external. As will be seen, the user may choose the external capacitor and resistor to set the desired off time, and the parameters of these discrete components can therefore have tight tolerances.

At time $t_b$ the load current portion $I_S$ flowing through the driver eimitter resistor 46 reaches a level, $I_p$, at which the voltage Vs across resistor 46 equals the voltage Vr across resistor 48. The reference voltage level Vr may be determined by the user by adjusting the reference current Ir generated by the current source 52, for setting the desired peak load current. The output feed-back voltage Vfb of the differential amplifier-comparator 50 goes high to reset the flip flop 42. The output voltage Vq of the flip flop 42 at terminal Q goes low; and gate 44 turns off the driver transistor 14, and transistor 24 is turned off. The capacitor 26 now begins to charge through resistor 28 while the load current $I_L$ flowing through the fly-back diode 20 begins to decay.

It was the intended operation of this early circuit that when at $t_c$ the voltage Vc of capacitor 26 reaches the threshold voltage Vth, the output Va of the comparator 34 goes high to set the flip flop output Vq high and to turn on the drive transistor 14 via gate 44. Load current Ihd L would again begin to rise. At the same time, transistor 24 would turn on to discharge the capacitor 26, waiting for the next instance, $t_d$, at which time (like at $t_b$) the rising load current $I_L$ once again exceeds the level predetermined by the reference voltage Vr, and at $t_d$ the flip flop 42 is again reset causing the output voltage Vq to go low.

For inductive loads with small stray wiring capacitance and especially with a small fly-back diode 20 with small charge storage capacity, this circuit does indeed operate as intended. But in a large number of circuit applications, this circuit tends to produce bursts of transient noise that adversely affect the reliability and accuracy of regulation of load current and transmits noise that may adversely affect the operation of other circuits nearby.

The example of noise bursts illustrated in the waveforms of FIGS. 2 through 7, shows for each burst three pulses 5, 6 and 7 of progressively diminishing amplitude in the current $I_S$ that flows through the sense resistor 46 as seen in FIG. 2. Each transient pulse in a burst occurs at a time, e.g. times $t_c$, $t_d$ and $t_e$, that the driver transistor 14 is turned back on. Each such pulse is attributable to charge storage in the flyback diode 20 and the driver transistor 14, and also possibly to collector capacitance charge, that are discharged into the driver transistor 14 upon being just turned on. When the amplitude of a noise pulse in a burst no longer exceeds Ip then it does not reset the flip flop 42 and normal intended operation can resume. In this circuit, the flip flop 42 is of the kind that whenever both a set and a reset signal are being applied, the set signal overrides the reset signal.

To see why a noise pulse occurs, consider for example the events just prior to, and at time $t_c$. At time $t_b$ the load current $I_L$ has reached the level at which the sense voltage across resistor 46 is equal to the reference voltage $V_R$ causing the output of the detecting comparator 50 to go high. The flip flop 42 is consequently reset and the output at terminal Q of flip flop 42 goes low turning off the driver transistor 14. At the same time transistor 24 turns off allowing the capacitor 26 to begin charging, as seen in the waveform of capacitor voltage Vc in FIG. 6. When at time $t_c$ the capacitor voltage reaches the threshold voltage Vth, the amplifier-comparator 34 produces a high logic output voltage Va that sets the flip flop 42. So far, this is normal and intended operation.

However, the setting of the flip flop 42 at time $t_c$ results in the transistor 24 being turned on to discharge the capacitor 26 and also results in the driver 14 being turned on. The above-noted stored charges discharge through the sense resistor producing a current pulse 5 (FIG. 2) that causes the output of detecting comparator 50 to go high and reset the flip flop. This leads to the transistor 24 being turned off and the capacitor 26 begins to charge almost immediately after having just been discharged. The flip flop 42 having been reset, turns off the driver 14. This unwanted sequence of events at time $t_c$ typically takes place within microseconds. The driver transistor 14 was intended to remain on and the load current was to have risen to the peak value Ip at a later time. Instead, in the example illustrated by the waveforms of FIGS. 2 through 7, the driver is prevented until time $t_e$ from turning on for any substantial amount of time. Thus the accuracy with which load current regulation is effected by this circuit is degraded.

The transient pulses attributable to stored charges must be higher than the peak currrent Ip to kick on the detector-comparator 50. In this example, only pulses 5 and 6 are greater than Ip while pulse 7 is less than Ip and permits a period of normal and intended operation to ensue.

Toward overcoming the above noted shortcomings of the "early" prior art circuit, it is known to introduce a logic-signal delay circuit 1, depicted by broken lines in FIG. 1, that delays the falling edge of the logic voltage Va by a fixed time interval so that the resetting of the flip flop 42, e.g. at times $t_c$ and $t_d$, is delayed enough to cover the period when the troublesome current spikes, those greater tha Ip, occur resetting (the just set) flip flop 42. Large noise spikes are thus "locked out" of the regulator circuit. Alternatively a delay circuit 2 and an AND gate 3 may be connected, as depicted by broken lines between the flip-flop output terminal Q and reset terminal R. This alternative delays the possible resetting of the flip flop 42 by a fixed delay time after the flip flop has been set to block or lock out noise pulses. The delay circuit 2 is of the kind that delays just the rising edge of the flip-flop output logic signal.

It is a primary object of this invention to provide a voltage chop circuit, for controlling and regulating inductive loads, having an improved means for locking out noise transients.

It is a further object of this invention to provide such a circuit providing the user a simple means for adjusting the lock out time, and thus greatly extending the variety of inductive loads that a regulator circuit can accurately drive.

It is yet a further object of this invention to provide such a circuit wherein there is provided a means by which the user may effect an optimum reduction of such noise transients for each of a variety of different loads or load conditions without the need for additional external components.

SUMMARY OF THE INVENTION

A current regulator circuit for inductive loads includes a driver transistor to which an inductor may be series connected. A logic memory element, such as a flip flop, has an output connected to the input of the driver transistor and when in the "on" state turns on the driver but when in the "off" state turns off the driver transistor. A detector comparator means is connected to the driver transistor for sensing the load current flowing through the driver transistor and producing a reset signal only when the driver transistor current exceeds a predetermined amplitude. An AND gate has an output connected to the reset terminal of the memory element and has one input connected to the output of the detector comparator means.

A memory, or flip-flop, -setting means is connected to the other input of the AND gate, and to the set terminal and the output terminal of the memory element. The memory-setting means includes a capacitor and a charge-discharge resistor connected to each other at circuit point X in the memory-setting means. The memory-setting means is for setting the memory element to the "on" stage at the end of an interval of time that begins at each turning off of the driver, which interval of time is a function of the product of the capacitance of the capacitor and the resistance of the charge-discharge resistor. The memory-setting means also includes a time-delay resistor and is additionally for blocking the resetting of the memory element for a time delay interval, after each turning on of the driver, which time delay interval is a function of the values of the capacitor and the delay resistor.

In one aspect of the invention, a capacitor and a charging resistor are series connected at a circuit point X. A voltage comparator means with hysteresis has an input connected to point X for producing at an output one logic level when the voltage at point X rises to a predetermined voltage and producing another logic level when the voltage at point X falls to a lower predetermined voltage. The output of the voltage comparator is connected to the flip flop and sets the flip flop when producing the one output logic level. A slow discharge means begins to discharge the capacitor at a rate determined by the value of a fixed resistor and the value of the capacitor when the voltage comparator means output is at the one logic level. A fast discharge means quickly discharges the capacitor when both the output of the voltage comparator means is at the other logic level and the flip flop is in the "on" state. A logic gate is connected to the flip flop, is connected to the voltage comparator means and is connected to the detector comparator means for resetting the flip flop only when the voltage comparator means is producing the other output logic level and the detector comparator means simultaneously produces the reset signal, which has the effect of preventing the repetitive generation of noise pulses attributable to charge storage by blocking the resetting of the flip flop at the critical time of turning on the driver.

The regulator circuit is preferably formed in a silicon integrated circuit chip, except that the capacitor and the charging-discharging resistor take the form of discrete external components to be supplied by the user of the integrated circuit. The integrated circuit user may thereby choose the load, e.g. a motor or solenoid, and then establish the transient-pulses blocking time by choosing the appropriate external capacitor for the particular characteristics of the load, which blocking time is just enough to block all large transient pulses, and may establish the desired driver off time by choosing the appropriate external resistor, while making accurate regulation possible down to a lowest minimum duty cycle in the driver transistor.

BRIEF DESCRIPTION OF THE DRAWINGS

FIGS. 2 through 7 show the waveforms of operating signal voltages and currents at particular points in the prior art circuit of FIG. 1.

FIGS. 9 through 15 show the waveforms of operating signal voltages and currents at the particular points in the circuit of FIG. 8.

DESCRIPTION OF THE PREFERRED EMBODIMENTS

Figure 1:
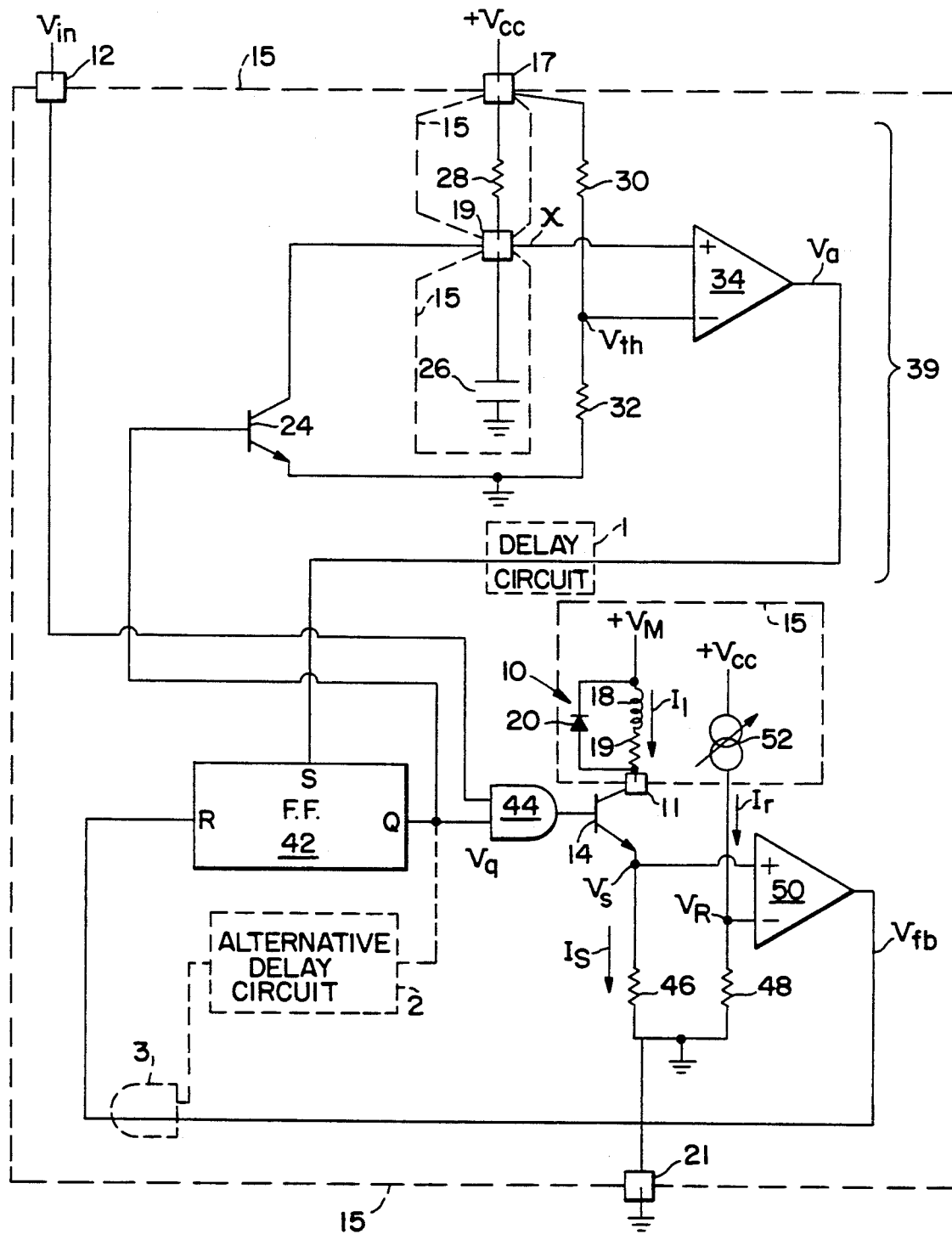
FIG. 1 shows a circuit diagram of a currentregulating voltage chop circuit of the prior art.
Figure 8:
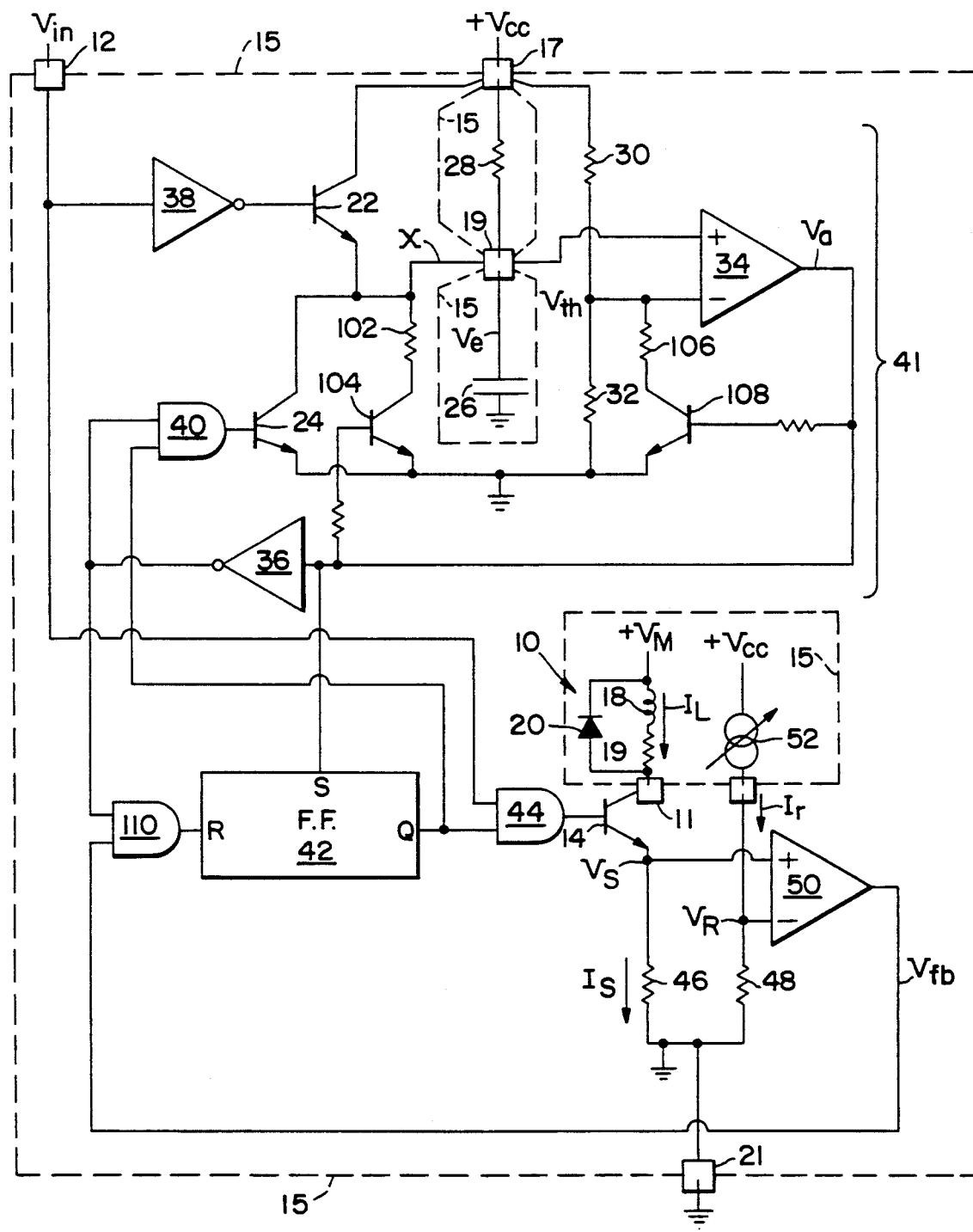
FIG. 8 shows a circuit diagram of a currentregulating voltage chop circuit of this invention.

Referring to FIG. 8, a voltage-chop current regulator circuit includes all the components shown in the prior art circuit of FIG. 1, and having the same numeral designations as in FIG. 1. They function as before, to turn on the driver transistor 14, to limit the load current to a value Ip by turning off the driver transistor 14, turning the driver transistor on again after a predetermined interval of time.

This circuit is formed in an integrated silicon circuit chip 15, the boundaries of which are indicated by dashed lines. The load 10 is located external to the integrated circuit 15 and connected thereto via the integrated circuit terminal pad 11. External components 26 and 28 are connected to the integrated circuit 15 via terminal pads 17, 19 and 21.

The circuit of FIG. 8 further includes an inverter 38 and a transistor 22 for keeping the capacitor 26 fully charged until the input signal at Vin goes high, at which time $t_1$ (see the waveforms in FIGS. 9 through 15) the flip flop 42 is assumed to be set and producing a high logic output so that the driver transistor 14 turns on and the load current $I_L$ begins to rise. Prior to time $t_1$ the fully charged capacitor 26 insures that the output of the amplifier-comparator 34 is high which in turn assures the above-noted high signal level at the output of flip flop 42.

When at time $t_1$ Vin goes high, e.g. 5 volts, the output of AND gate 44 goes high and the driver transistor 14 turns on. Load current $I_L$ begins to build up; meanwhile transistor 104 is on and the capacitor 26 begins to discharge through resistor 102, the transistor 108 has been turned on and when the capacitor voltage Vc drops to the reduced threshold voltage Vth, the output logic signal from amplifier-comparator 34 goes low, at time $t_2$. The load current continues to rise until time $t_3$ at which time the voltage $V_S$ across resistor 46 equals the reference voltage $V_R$ and the output from detector comparator 50 goes high to reset the flip flop and turn off the driver transistor 14.

As in the prior art circuit, the output Q of the multivibrator or flip flop 42 is connected, via AND gate 44, to the base of the driver transistor 14 and the turning off of the driver transistor 14 is accomplished by providing a comparator means, having a DC reference current source 52 and a comparator 50, for resetting the flip flop 42 whenever the load current rises to the predetermined peak value Ip at which the voltage across resistor 46 $V_S$ is about to exceed $V_R$.

The old and the new circuit also employ a subcircuit referred to herein as a flip-flop-setting circuit, namely that part 39 of the circuit of FIG. 1 and that part 41 of the circuit of FIG. 8, for providing a high set signal via Va to the flip-flop set terminal S to set the flip flop 42 and turn on the driver transistor 14 again after the lapse of the above said predetermined interval, e.g. between $t_3$ and $t_4$.

In the circuit of FIG. 8, however, there is additionally included a slow discharge circuit composed of resistor 102 and transistor 104; and a hysteresis circuit, for shunting the resistor 32, that is composed of resistor 106 and transistor 108. The bases of transistors 104 and 108 are connected to the output of the comparator amplifier 34. Now during each period, e.g. between $t_4$ and $t_4+t^*$, when the set signal at the output of amplifier 34 is high, these transistors are held on so that the capacitor 26 is now slowly discharged through resistor 102 and the threshold voltage Vth is reduced by the lower value of the parallel combination of resistors 32 and 106. As soon as the voltage Vc of capacitor 26 reaches the lowered threshold voltage Vth, the voltage Va goes low at a later time ($t_4+t^*$) and at this later time transistors 104 and 108 are turned off while transistor 24 is turned on to quickly and completely discharge capacitor 26.

Note that the driver transistor 14 in FIG. 8 has been switched on at $t_4$ as was the case in the prior circuit of FIG. 1. This is a time at which bursts of transient noise pulses begin to occur in the prior art circuit. However, in the circuit of FIG. 8, during the time interval, $t^*$, the flip flop 42 is blocked from being reset by pulses being fed back from the comparator 50. A necessary condition for bursts of pulses to occur is that each such pulse in the driver transistor 14 could be fed back through the comparator 50 to reset the flip flop 42 in the prior circuit.

Figure 16:
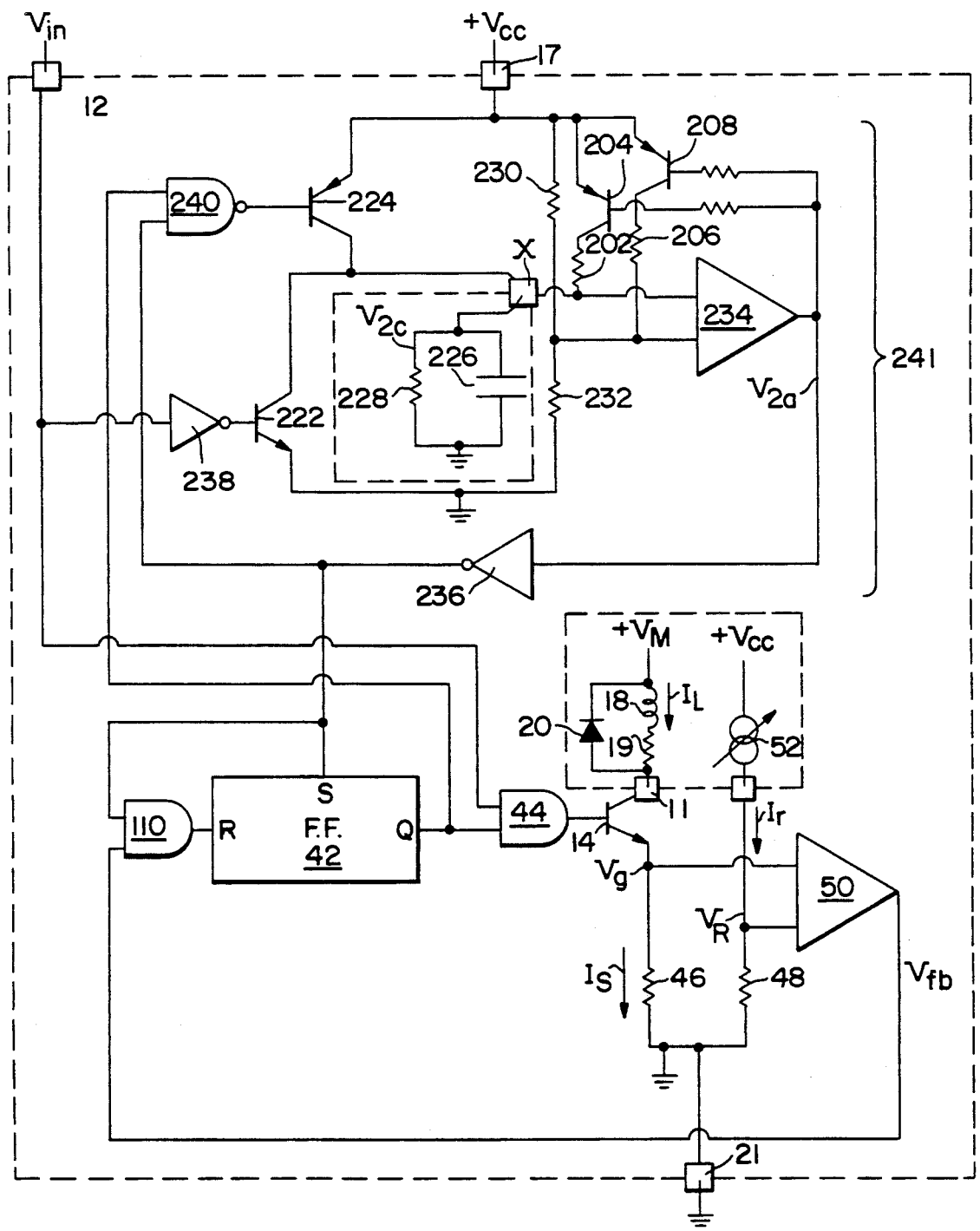
FIG. 16 shows a circuit diagram of another current-regulating voltage chop circuit of this invention.

The circuit of FIG. 16 employs some of the same components connected in the same configuration as used in the circuit of FIG. 8, namely those in the lower half of the Figures. The other components of FIG. 16 have numerals in the 200 series each corresponding to the component in FIG. 8 having essentially the same function.

The inverter 238 and the transistor 222 are for keeping the capacitor 26 fully discharged until the input signal at Vin goes high, at which time the flip flop 42 is assumed to be set and producing a high logic output so that the driver transistor 14 turns on and the load current $I_L$ begins to rise. Prior to application of a high input logic signal, the fully discharged capacitor 226 insures that the output of the amplifier-comparator 234 is low which via inverter 236 assures a high logic signal level at the output of flip flop 42.

When at the time $t_1$ Vin goes high, the output of AND gate 44 goes high and the driver transistor 14 turns on. Load current $I_L$ begins to build up; meanwhile transistor 222 turns off and transistor 204 is turned on so that the capacitor 226 begins to charge through resistor 202; the transistor 208 has been turned on so that resistor 206 parallels resistor 230, increasing the originally low threshold voltage Vth that was determined by resistors 230 and 232. When the capacitor voltage $V_{2c}$ rises to the increased threshold voltage Vth, the output logic signal $V_{2a}$ from amplifier-comparator 234 goes high, at a time corresponding to $t_2$ in the waveforms in FIGS. 9, 10 and 11 that are equally applicable to the circuit of FIGS. 8 and 16. Now the high logic signal at the output of comparator 234 turns on transistor 224 to quickly and fully charge the capacitor to Vcc.

The load current $I_L$ continues to rise until time $t_3$ at which the voltage $V_S$ across resistor 46 equals the reference voltage $V_R$ and the output from detector comparator 50 goes high to reset the flip flop 42 and turn off the driver transistor 14, and the load current $I_L$ begins to decay.

Also at time $t_3$ the output signal from the output of the flip flop 42 goes low and turns off the transistor 224 via inverted AND gate 240 so that the capacitor 226 begins to discharge through resistor 228.

When at time $t_4$ the capacitor has discharged to the lower threshold voltage Vth, the output signal from the comparator 234 goes low to set the flip flop 42 and turn on the driver transistor 14 and at the same time turns on transistors 204 and 208.

During each period, e.g. between $t_4$ and $t_4+t^*$, when the set signal at the output of amplifier 234 is low, these transistors 204 and 208 are held on so that the capacitor 226 is in that period slowly charged through resistor 202 and the threshold voltage Vth is held at the higher value of the parallel combination of resistors 230 and 206. As soon as the voltage $V_{2c}$ of capacitor 226 reaches the high threshold voltage Vth, the voltage $V_{2a}$ goes high at a later time ($t_4+t^*$) and at this later time transistors 204 and 208 are turned off while transistor 224 is turned on to quickly and completely charge capacitor 226. This cycle now repeats itself indefinitely as long as the Vin remains high. The waveforms of the signals in the circuit of FIG. 16 are the same waveforms shown in FIGS. 9, 10, 11, 12 and 13. The waveforms in FIGS. 14 and 15 for Vc and Va may be inverted to obtain the waveforms of $V_{2c}$ and $V_{2a}$ for the circuit of FIG. 16.

This invention recognizes inter alia that it is desirable to keep the lockout period t* as short as possible because the lockout period contributes to the minimum possible driver "on" time, e.g. $t_4$ to $t_5$. The minimum possible duly cycle is Dmin = (min. "on"time)/(Toff + min. "on"time)

where Toff is the driver "off" time, e.g. $t_5$ to $t_6$, and Dmin relates directly to the lowest value of peak load current Ip that can be successfully controlled. For Toff $(L/R)_{load}$, the lowest possible average regulated load current $I_{Lmin}$ equals $D_{min}V_M/R_{load}$.

The circuit of this invention provides a means for blocking the resetting of the flip flop 42 at the critical time of turning on the driver transistor 14. This is accomplished by the further addition of an AND gate 110. Now the flip flop 42 can only be reset when the flip flop set signal from the flip-flop-setting circuit portion 41/241 and the feedback voltage Vfb from the detecting comparator 50 are high. Thus resetting of the flip flop 42 is blocked during this critical time t* that is established by the added transistors 104/204 and 108/208 and resistors 102/202 and 106/206.

The circuit of this invention for locking out noise pulses is particularly advantageous because it provides an opportunity to give the user control over the amount of blocking time ($t_d$) so that an optimum blocking time may be obtained for any of a wide variety of inductive loads 10. The user provides the appropriate value external capacitor 26/226 that in combination with the integrated resistor 102/202 gives the desired delay time t*. The user then provides the appropriate value external resistor 28/228 to realize the desired driver-off time.

What is claimed is:

1. A current regulator circuit for inductive loads comprising:
    a driver transistor to which an inductive load may be connected;
    a logic memory element having a set terminal, having a reset terminal and having an output terminal connected to the input of said driver transistor for when set to an "on" state turning on said driver transistor and when reset to the "off" state turning off said driver transistor;
    a detector comparator means connected to said driver transistor for sensing the load current flowing through said driver transistor and connected to said memory element for producing a reset signal only when the driver-transistor current exceeds a predetermined amplitude;
    an AND gate having an output connected to said reset terminal of said memory element and having one input connected to said output of the detector comparator means;
    a memory-element setting means connected to another input of said AND gate, to said set terminal and to said output terminal of said memory element, said memory-element setting means including a capacitor and a charge-discharge resistor connected to each other at a circuit point X, said memory-setting means being for setting said memory element to the "on" state at the end of an interval of time that begins at each turning off of said driver transistor, which interval of time is a function of the product of the capacitance of said capacitor and the resistance of said charge-discharge resistor, said memory-setting means also including a time-delay resistor and being additionally for blocking the resetting of said memory element for a time delay interval, after each turning on of said driver transistor, which time delay interval is a function of the capacitance of said capacitor and resistance of said delay resistor.

2. The current regulator circuit of claim 1 additionally comprising a silicon integrated circuit in which said current regulator circuit is formed with the exception that said capacitor and said charge-discharge resistor are discrete components external to and connected to said integrated circuit.

3. A current regulator circuit for inductive loads comprising:
    a driver transistor to which an inductive load may be connected:
    a flip flop means having an output to which the input of said driver transistor is connected, for producing an "on" logic signal at the driver transistor input when in the set state and producing an "off" logic signal when in the reset state;
    a detector comparator means connected to said driver transistor for sensing the current through said driver transistor and for producing a reset signal only when the driver-transistor current exceeds a predetermined value;
    a flip-flop-setting means comprising:
        a) a capacitor and a charging resistor series connected at circuit point X,
        b) a voltage comparator means with an input connected to circuit point X for producing one logic level when the voltage at circuit point X rises to a first predetermined voltage and producing the other logic level when the voltage at circuit point X falls to a lower predetermined voltage,
        c) a fast discharge means connected across said capacitor and connected to said voltage comparator means for quickly discharging said capacitor when the voltage comparator means produces the other logic level and when simultaneously said flip flop means is in the set state and producing said "on" logic signal, and
        d) a slow discharge means connected across said capacitor and connected to said voltage comparator means for more slowly discharging said capacitor when said voltage comparator means produces the one logic level;
    said flip flop means being further connected to said flip-flop-setting means and connected to said detector comparator means, for being set by said one output logic level of said flip-flop-setting means, and for being reset only when the reset signal from said detector comparatormeans and the other logic level from said flip-flop-setting means exist simultaneously.

4. The current regulator circuit of claim 3 additionally comprising a silicon integrated circuit in which said current regulator circuit is formed with the exception of said capacitor and said charging resistor that are discrete components external to and connected to said integrated circuit.

5. The current regulator circuit of claim 3 additionally comprising a current-regulator input terminal and an AND gate through which said flip-flop output is connected to said driver-transistor input, an input of said AND gate being connected to said current-regulator input terminal, so that an "on" logic signal at the output of said flip flop will only turn on said driver transistor when a signal applied at said current-regulator input terminal is of the same logic level as is that of said "on" logic signal.

6. The current regulator circuit of claim 5 additionally comprising a transistor connected in shunt across said charging resistor, and a logic invertor circuit connected between said current-regulator input terminal and the input of said shunt connected transistor for turning on said shunt connected transistor only when the signal applied at said current-regulator input terminal is not of the same logic level as that of said "on" logic signal.

7. A silicon integrated circuit current regulator for inductive loads comprising:
 a driver transistor to which an inductive load may be connected;
 a flip flop having an output connected to the input of said driver transistor for producing at said flip flop output an "on" logic signal when in the set state and an "off" logic signal when in the reset state; a detector comparator means connected to said driver transistor for sensing the current through said driver transistor and for producing a reset signal only when the driver-transistor current exceeds a predetermined value;
 a flip-flop-setting means comprising:
  a) a pair of terminals to which an external discrete capacitor and an external discrete charging resistor may be series connected, and a single terminal located at a circuit point X in said integrated circuit to which the junction of said series connected external capacitor and resistor may be connected,
  b) a voltage comparator means with an input connected to said circuit point X for producing one logic level when the voltage at said circuit point X rises to a first predetermined voltage and producing the other logic level when the voltage at said circuit point X falls to a lower predetermined voltage,
  c) a fast discharge means connected across those of said terminals to which said capacitor may be connected, and to said voltage comparator means for quickly discharging said capacitor when the voltage comparator means produces the other logic level and when simultaneously said flip flop is is in the set state and producing "on" logical signals, and
  d) a slow discharge means connected across those of said terminals to which said capacitor may be connected and to said voltage comparator means for more slowly discharging said capacitor when said voltage comparator means produces the one logic level,
 said flip-flop-setting means being connected to said flip flop for setting said flip flop when said voltage comparator means produces the one output logic level; and a logic gate connected to said flip flop output and connected to said voltage comparator means and to said detector comparator means for resetting said flip flop only when both said voltage comparator means is producing the other logic level and said detector comparator means produces the reset signal.

8. A current regulator circuit for inductive loads comprising:
 a driver transistor to which an inductive load may be connected;
 a flip flop means having an output to which the input of said driver transistor is connected, for producing an "on" logic signal at said driver input when in the set state for producing an "off" logic signal when in the reset
 a detector comparator means connected to said driver transistor for sensing the current through said driver transistor and for producing a reset signal only when the driver-transistor current exceeds a predetermined value;
 a flip-flop-setting means comprising:
  a) a capacitor and a discharging resistor connected in parallel, one junction thereof being at circuit point X,
  b) a voltage comparator means with an input connected to circuit point X for producing one logic level when the voltage at circuit point X falls to a first predetermined voltage and producing the other logic level when the voltage at circuit point X rises to a lower predetermined voltage,
  c) a fast charging means connected to circuit point X and connected to said voltage comparator means for quickly charging said capacitor when the voltage comparator means produces the other logic level and when simultaneously said flip flop means is in the set state and producing said "on" logic signal, and
  d) a slow charging means connected to circuit point X and connected to said voltage comparator means for more slowly charging said capacitor when said voltage comparator means produces the one logic level; said flip flop means being further connected to said flip-flop-setting means and connected to said detector comparator means, for being set by said one output logic level of said flip-flop-setting means, and for being reset only when the reset signal from said detector comparator-means and the other logic level from said flip-flop-setting means exist simultaneously.

9. The current regulator circuit of claim 8 additionally comprising a silicon integrated circuit in which said current regulator circuit is formed with the exception that said capacitor and said discharging resistor are discrete components external to and connected to said integrated circuit.

* * * * *